United States Patent [19]
Hoagland

[11] Patent Number: 5,527,056
[45] Date of Patent: Jun. 18, 1996

[54] TRAILER HITCH COVER

[76] Inventor: Carmen D. Hoagland, 3185 Nelson Rd., Longmont, Colo. 80503

[21] Appl. No.: 281,329

[22] Filed: Jul. 27, 1994

[51] Int. Cl.$^6$ ..................................................... B60D 1/60
[52] U.S. Cl. ............................................ 280/507; 70/158
[58] Field of Search ................................ 280/507, 511, 280/512, 514; 70/232, 258, 158, 160, 164

[56] References Cited

U.S. PATENT DOCUMENTS

| | | |
|---|---|---|
| 2,497,362 | 2/1950 | Lachowicz ........................ 280/507 X |
| 2,512,222 | 6/1950 | Brock ................................... 280/507 |
| 3,605,457 | 9/1971 | Foster ................................. 280/507 X |
| 4,141,569 | 2/1979 | Dilk ...................................... 280/507 |
| 4,738,293 | 4/1988 | Ostrom et al. .................... 280/507 X |
| 4,852,902 | 8/1989 | Young et al. ........................ 280/507 |
| 5,037,122 | 8/1991 | Beckerer, Jr. ...................... 280/507 |
| 5,161,815 | 11/1992 | Penor, Jr. ......................... 280/511 X |
| 5,421,601 | 6/1995 | Hinze et al. ....................... 280/507 |

FOREIGN PATENT DOCUMENTS 2218391  11/1989  United Kingdom ............... 280/507

Primary Examiner—Margaret A. Focarino
Assistant Examiner—F. Zeender
Attorney, Agent, or Firm—Homer L. Knearl; Holland & Hart

[57] ABSTRACT

A trailer hitch cover assembly covers the entire V-shaped trailer hitch assembly to protect the trailer hitch from the elements and prevent injury to horses and children. A cap snaps or locks onto the hinged sides of the cover, and the sides snap or lock onto a base. A top rear panel folds down from the cap to just above the top of the trailer hitch, and a bottom rear panel folds up from the base. A wheel block in the base supports the wheel of the trailer hitch, and holds the cover assembly firmly over the hitch assembly. The cap, base and sides of the cover are preferably formed of a light-weight plastic, such as low density polyethylene. Locking connectors may be used to connect the cap and base to the sides.

18 Claims, 3 Drawing Sheets

TRAILER HITCH COVER

BACKGROUND OF THE INVENTION

1. Field of the Invention

This invention relates to a cover for trailer hitches.

2. Description of the Related Art

A horse trailer is generally pulled behind a vehicle by means of a V-shaped draw-bar trailer hitch. The wide part of the V attaches to the trailer frame, and the narrow part of the V extends horizontally forward and connects to the vehicle by means of a hitch ball. A vertical post, attached to the narrow part of the V-shaped tongue of the trailer hitch, has a wheel at its lower end, and is adjustable in height to hold the trailer level.

When not being used to transport horses, horse trailers are frequently left in fields. The trailer hitch poses a safety hazard to horses in the field. Some draw-bar hitches manufactured in the past actually have an opening in the V-shaped tongue, into which horses could step and break their legs. Newer hitches have this opening covered, but still pose safety hazards because of attached chains and wires which pose tripping hazards, and the vertical supporting post on which horses can impale themselves.

While prior patents, such as U.S. Pat. Nos. 4,738,293, 4,852,902, and 5,037,122, have disclosed covers for the hitch coupling portion of the trailer hitch, no prior inventions have solved the problem of hazards posed by trailer hitches.

SUMMARY OF THE INVENTION

In accordance with the present invention, a trailer hitch cover for a trailer hitch with a V-shaped tongue has a V-shaped cap, two walls connected together at one end to form a V and connected to the cap, and a base connected to the bottom of the walls. Preferably, the cap and the base are detachable from the walls for convenient storage. In the preferred embodiment, the cap snaps or locks over the walls for preventing water from flowing under the cap, and the walls snap or lock over the base for preventing water from flowing into the base.

As a feature of the present invention, the walls are rotatably attached to each other with a hinge; the hinge connects the two walls at the point of the V. As another feature, an upper flap, rotatably attached to the cap, folds down into close proximity with the top of the tongue; and a lower flap rotatably attached to the base folds up into close proximity with the bottom of the tongue. In the preferred embodiment, the cap, the walls, and the base are formed of low density polyethylene.

Those having normal skill in the art will recognize the foregoing and other features and applications of the present invention from the following more detailed description of the preferred embodiments as illustrated in the accompanying drawings.

DETAILED DESCRIPTION OF THE PREFERRED EMBODIMENTS

Figure 1:
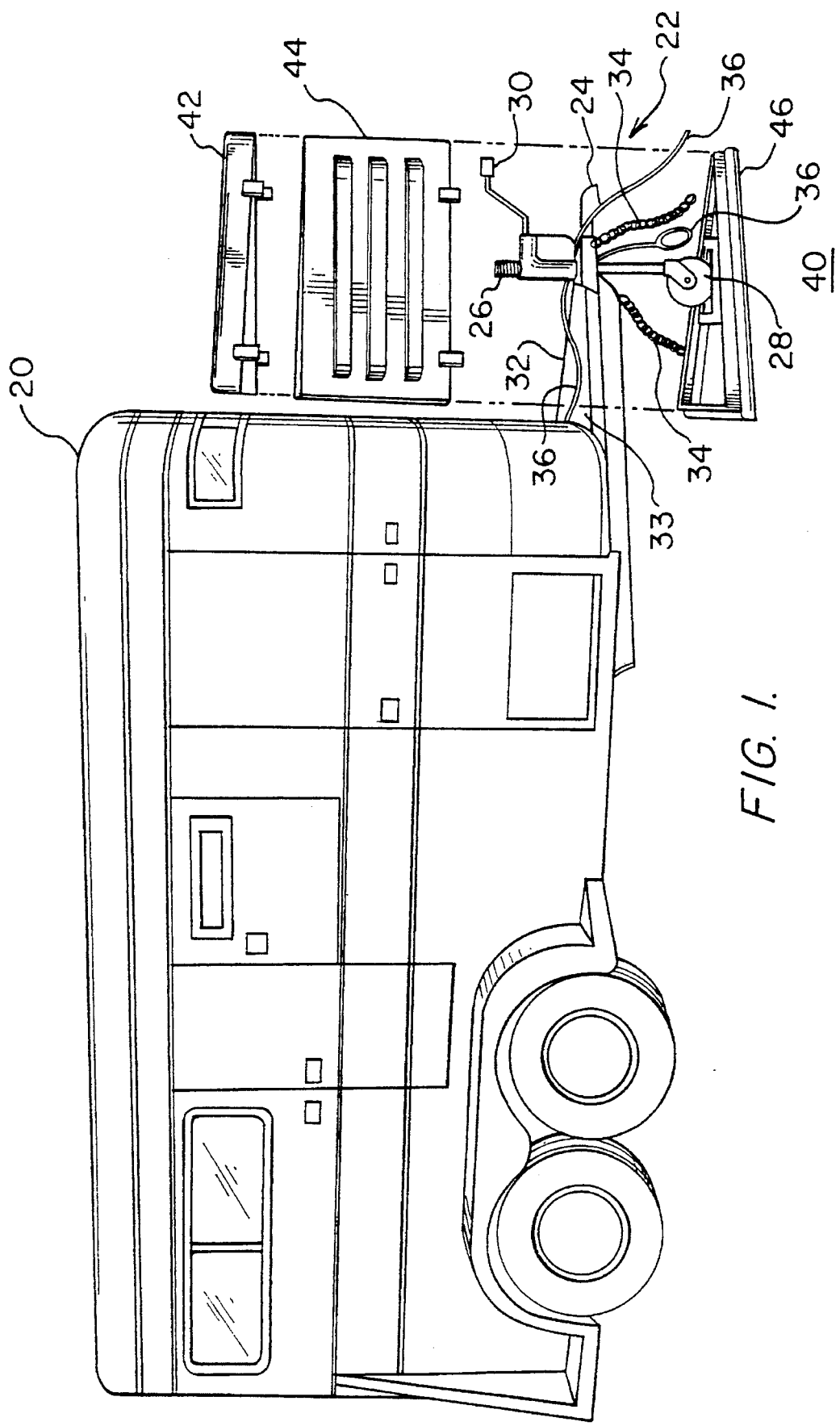
FIG. 1 is an isometric side view of a horse trailer and a trailer hitch having a trailer hitch cover shown in exploded side view in accordance with the present invention.

FIG. 1 shows a conventional horse trailer 20 and trailer hitch 22 with an exploded trailer hitch cover 40 in accordance with the present invention. Trailer hitch 22 has a conventional hitch coupling 24 to attach the trailer for transporting horses to a vehicle (not shown). Post 26 has a wheel 28 attached to its lower end to support the trailer 20 when it is not attached to a vehicle. Crank or jack 30 raises post 26 away from the ground for transport, and lowers post 26 so that wheel 28 contacts the ground for supporting trailer 20.

Hazards to horses are inherent in conventional trailer hitches like 22. A horse could fall over the V-shaped tongue 32, chains 34, or wire 36. Chains 34 are safety chains to attach trailer 20 to the vehicle. Wires 36 provide electrical connection to trailer 20 for brakes and lights, and notification to the vehicle driver if the trailer comes unhitched. A horse could also impale himself on post 26. Older trailer hitches are even worse because the trailer hitch tongue 32 had an opening 33 into which horses could step and break their legs.

Trailer hitch cover 40 is made of a light-weight flexible plastic, such as 0.15 inch thick low density polyethylene. It comprises a top cap 42, sides 44 and 43 (shown in FIG. 3), a base 46, and rear panels 47 and 48 (shown in FIG. 4).

Figure 2:
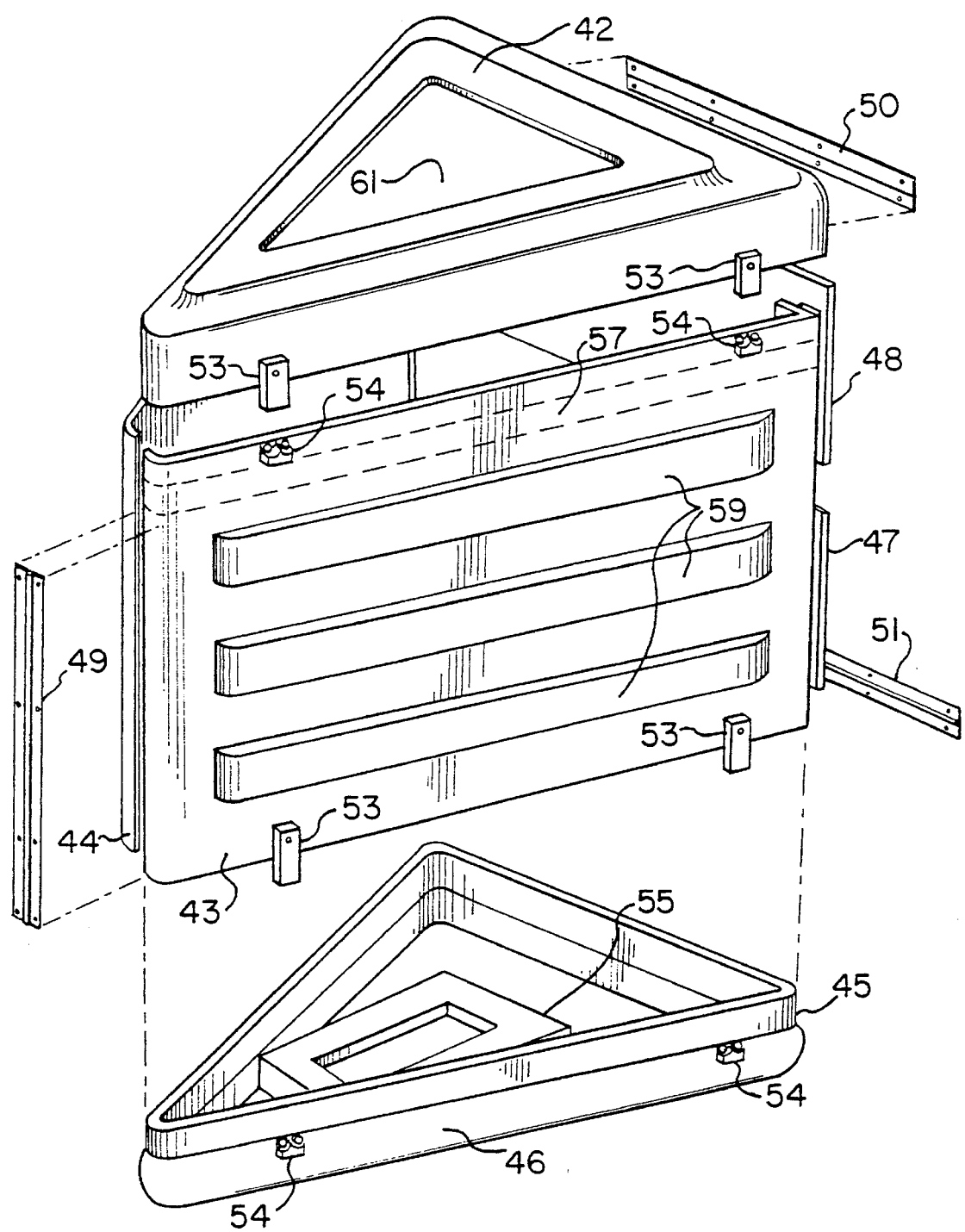
FIG. 2 is an exploded front and side view of the trailer hitch cover of FIG. 2.

FIG. 2 shows an exploded front and side view of the cover of FIG. 1. Top cap 42 has a recessed area 61 for placement of graphics or a decal. Sides 44 and 43 are hinged together at the front of cover 40 (the cover is V-shaped, and hinge 49 connects sides 43 and 44 at the point of the V). Hinge 49 is placed inside cover 40, and allows sides 43 and 44 to fold together for storage. Top cap 42 fits over sides 43 and 44, and is attached to sides 43 and 44 by means of connectors 53, such as locking cabinet latches or adjustable, noncorrosive draw latches. Connectors 53 connect to catches 54 which are attached by the end user. The user lines up a template (not shown) included with the cover 40, drills the appropriate holes, and nuts and bolts the catches 54 in the desired location. Locking latches may be used to help prevent casual theft. Cap 42 fits over sides 43 and 44 so that water flowing down the sides of cover 40 does not make its way inside the cover 40. Protrusions 59 give sides 43 and 44 more rigidity, and prevent the sides from buckling.

Score lines 57 allow users of cover 40 to size cover 40 to the height of their individual trailer hitches. A user can lower the height of cover 40 by cutting along one of the score lines with shears or a knife. Typically, sides 43 and 44 have five score lines 57 around one-inch apart, allowing a user to shorten the cover 40 by as much as five inches.

Top cap 42 is attached to top rear panel 48 by means of a hinge 50. Hinge 50 is attached to the inner surfaces of top cap 42 and upper rear panel 48 in such a way that upper panel 48 folds inward. Placement of hinge 50 inside cover 40 prevents horses from cutting themselves on it.

Lower rear panel 47 is connected by means of hinge 51 to base 46. Hinge 51 is placed inside cover 40, and allows panel 47 to fold inward. Base 46 has an inner lip 45 which fits inside sides 43 and 44, and prevents them from collapsing. In addition, because base 45 fits inside sides 43 and 44, water flowing down sides 43 and 44 cannot get inside base 46. Base 45 is attached to sides 43 and 44 by means of connectors 53, such as locking cabinet latches or adjustable, noncorrosive draw latches.

Wheel block 55 is made of low-density polyethylene, or wood, and is adjustable and removable. Wheel block 55 simply sits on the bottom of base 46, and may be moved forward or backward to accommodate different trailer hitches.

In storage, cover 40 is composed of three separate pieces. Cap 42 has top panel 48 folded against it. Base 46 has bottom panel 47 folded against it. Sides 43 and 44 are folded towards each other. Each of the three pieces is fairly flat so that the whole cover when the three pieces are stacked together is only about eight-inches thick.

Cover 40 is assembled around trailer hitch 22 as follows. Base 46 is placed on the ground, and wheel 28 of trailer hitch 22 is placed in wheel block 55. Back panel 47 folds upward until it is vertical. Back panel 47 can be cut so that it meets, or comes into close proximity to the bottom of tongue 32 when it is folded into the vertical position. Sides 43 and 44 are opened, and then rotated together until they just fit over inner lip 45 of base 46. Connectors 53 are connected to catches 54. Flap 47 slides over the outside of lips 63 and 64 of panels 43 and 44, which prevent it from rotating back down toward base 46. Latches, or rotating clips 65, may be used to prevent panel 47 from rotating down away from lips 63 and 64. Then cap 42 fits over sides 43 and 44 with upper rear panel 46 folded down to slide over the outside of lips 63 and 64 (FIG. 4). The bottom of flap 48 should contact, or be in close proximity to the top of tongue 32. Score lines 57 allow an individual owner to shorten sides 43 and 44, thus lowering the bottom of panel 48. Since the score lines are one-inch apart, it is possible for the owner to ensure that the bottom of flap 48 is within one inch of the top of tongue 32 by cutting sides 43 and 44 along a score line 57. The catches 54 (FIG. 2) are added by the user at the appropriate height after the sides have been shortened.

There is a space left between panels 47 and 48 when folded vertical for the tongue 32. This space may be customized for an individual trailer hitch by shortening sides 43 and 44 at score lines 57 to lower the bottom of panel 48, and by shortening panel 47 by cutting off the end opposite its hinge 51. Panel 48 may also be shortened by cutting off the end opposite hinge 50, if desired.

Lip 45 of base 46 prevents sides 43 and 44 from collapsing together, and cap 42 prevents them from opening up further. Lips 63 and 64 prevent panels 47 and 48 from folding inward. The Weight of the trailer on wood or molded plastic wheel block 55 holds the cover 40 in place.

Figure 3:
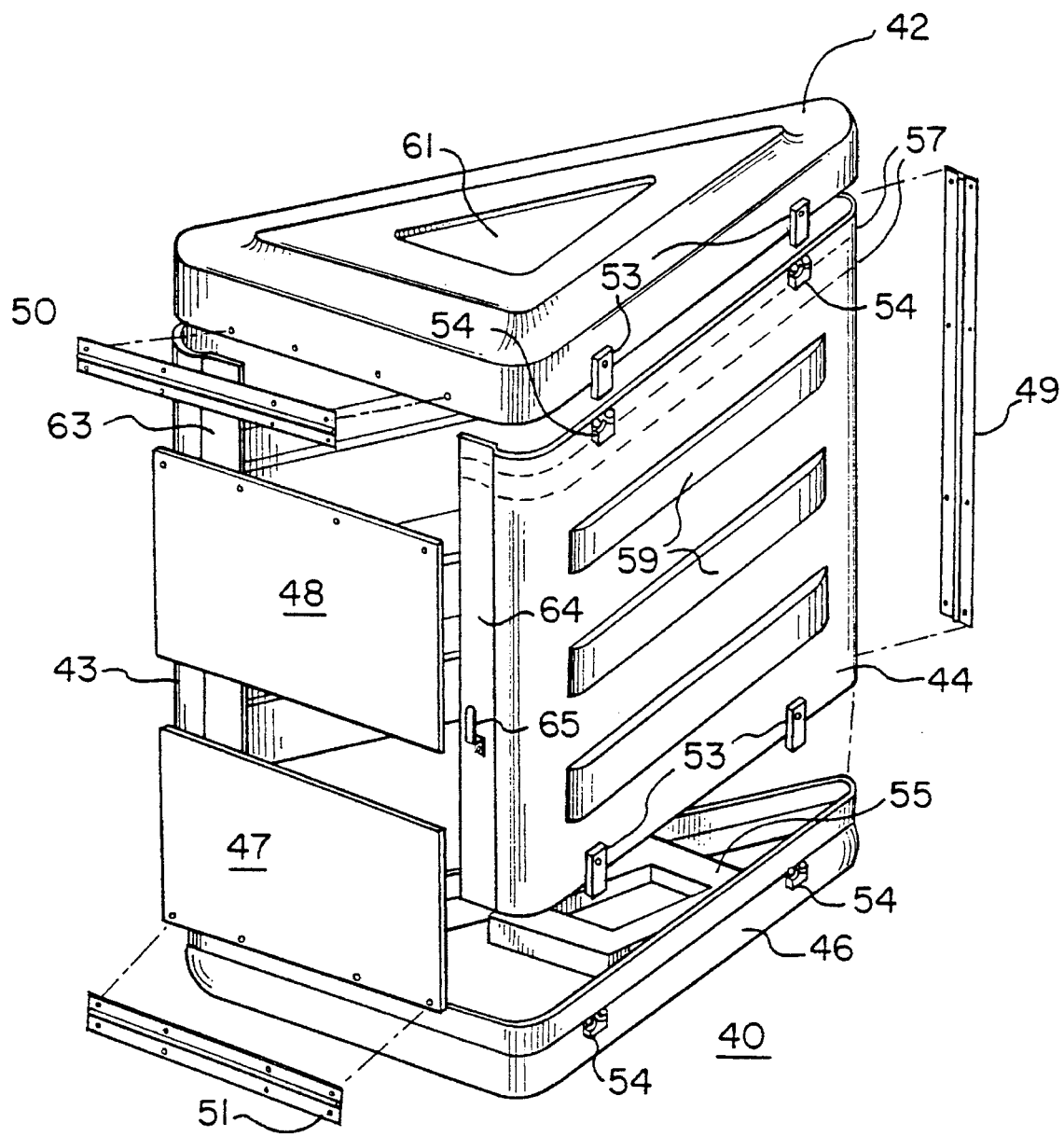
FIG. 3 is an exploded rear and side view of the trailer hitch cover of FIG. 2

From FIGS. 1 and 3, it can be seen that panel 48 folds downward toward the top of tongue 32, and panel 47 folds upward toward the bottom of tongue 32. The only openings into cover 40, once assembled, are spaces between panels 47 and 48 and tongue 32, and the slight separation between upper panel 48 and lower panel 47 along the sides of tongue 32. Thus, in addition to protecting horses from injury, cover 40 prevents water, snow, dust, leaves, and the like, from getting to the trailer hitch 22.

While the exemplary preferred embodiments of the present invention are described herein with particularity, those having normal skill in the art will recognize various changes, modifications, additions and applications other than those specifically mentioned herein without departing from the spirit of this invention. For example, cover 40 could be used on other kinds of trailer hitches besides horse trailer hitches to protect the hitches from rain and dust, or to protect children playing around the trailer.

What is claimed is:

1. An apparatus for covering a trailer hitch of a trailer body, the trailer hitch having a hitch coupling, a support post, and a tongue, said apparatus comprising:

a cap shaped to cover the top of the trailer hitch including the hitch coupling, the support post, and the tongue;

two walls, each wall having an interior and exterior surface, a first and second side edge, a top edge, and a bottom edge;

the first side edge of each of the two walls connected together for covering substantially the sides of the trailer hitch including the hitch coupling, the support post, and the tongue;

the top edge of each of the two walls mating with the cap;

a base mating with the bottom edge of each of the two walls for covering substantially the bottom of the trailer hitch including the hitch coupling, the support post, and the tongue; and said base resting on the ground and supporting the trailer hitch through the support post.

2. The apparatus of claim 1 wherein:

the cap is detachable from the top edge of each of the two walls; and the base is detachable from the bottom edge of each of the two walls.

3. The apparatus of claim 2 wherein:

the cap is adapted to fit over the top edge of each of the two walls for preventing water from flowing in between the interior surface of each of the two walls; and the bottom edge of each of the two walls is adapted to fit over the base for preventing water from flowing into the base.

4. The apparatus of claim 2 wherein the first side edge of one of the two walls is rotatably attached with a hinge to the first side edge of the other of the two walls.

5. The apparatus of claim 4 wherein the hinge is mounted to the interior surface of each of the two walls.

6. The apparatus of claim 1 wherein the cap, the two walls, and the base are formed of low density polyethylene.

7. The apparatus of claim 1, wherein the trailer hitch has a wheel block for supporting the trailer hitch on the base.

8. The apparatus of claim 1 further comprising:

a lockable draw latch for releasably connecting the cap to the top edge of one of the two walls; and a lockable draw latch for releasably connecting the bottom edge of one of the two walls to the base.

9. Apparatus for covering a trailer hitch having a V-shaped tongue comprising:

a V-shaped cap sized and shaped to cover substantially the entire top of the hitch;

two walls, one side of each wall connected together to form a V shape, the top of each wall attached to the cap, for covering substantially the entire sides of the hitch;

a base connected to the bottom of each wall for covering substantially the entire bottom of the hitch and supporting the hitch;

an upper flap rotatably attached to the cap for folding down into close proximity to the top of the V-shaped tongue of the trailer hitch; and a lower flap rotatably attached to the base for folding up into close proximity to the bottom of the V-shaped tongue of the trailer hitch.

10. The apparatus of claim 9 wherein:

the cap is detachable from each of the two walls; and the base is detachable from each of the two walls.

11. The apparatus of claim 10 wherein:

the cap is adapted to fit over each of the two walls for preventing water from flowing in between the two walls; and each of the two walls is adapted to fit over the base for preventing water from flowing into the base.

12. The apparatus of claim 10 wherein one of the two walls is rotatably attached with a hinge to the other of the two walls.

13. The apparatus of claim 12 wherein the hinge is mounted to the interior of each of the two walls.

14. The apparatus of claim 9 wherein the cap, the two walls, and the base are formed of low density polyethylene.

15. The apparatus of claim 9, wherein the trailer hitch has a wheel block for supporting the trailer hitch on the base.

16. The apparatus of claim 9, further comprising: a lockable draw latch for releasably connecting the cap to one of the two walls; and a lockable draw latch for connecting one of the two walls to the base.

17. The apparatus of claim 9, wherein the upper flap is rotatably attached to the cap by a hinge mounted to the interior surface of the cap and the upper flap.

18. The apparatus of claim 9, wherein the lower flap is rotatably attached to the base by a hinge mounted to the interior surface of the base and the lower flap.

* * * * *